(12) United States Patent
Jayaraman et al.

(10) Patent No.: US 7,675,706 B2
(45) Date of Patent: Mar. 9, 2010

(54) METHODS AND APPARATUS FOR PROXIMITY DETECTION OF HARD DISK DRIVE READ HEADS

(75) Inventors: Rajkumar Jayaraman, Plano, TX (US);
Taras Dudar, Plano, TX (US);
Seungwoo Jung, Dallas, TX (US);
Ashish Manjrekar, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 69 days.

(21) Appl. No.: 12/039,300

(22) Filed: Feb. 28, 2008

(65) Prior Publication Data

US 2009/0219650 A1    Sep. 3, 2009

(51) Int. Cl.
*G11B 21/02* (2006.01)
*G11B 27/36* (2006.01)
(52) U.S. Cl. .......................................... 360/75; 360/31
(58) Field of Classification Search ................ None
See application file for complete search history.

(56) References Cited

U.S. PATENT DOCUMENTS

| | | | |
|---|---|---|---|
| 7,253,984 B1 * | 8/2007 | Patapoutian et al. | 360/75 |
| 2008/0158715 A1 * | 7/2008 | Hirano et al. | 360/75 |
| 2008/0285168 A1 * | 11/2008 | Hashizume et al. | 360/72.1 |
| 2009/0122437 A1 * | 5/2009 | Gong et al. | 360/75 |

\* cited by examiner

*Primary Examiner*—Andrew L Sniezek
(74) *Attorney, Agent, or Firm*—Dawn V. Stephens; Wade James Brady, III; Frederick J. Telecky, Jr.

(57) ABSTRACT

Methods and apparatus for proximity detection of hard disk drive read heads are disclosed. A disclosed method comprises forming a first signal having a frequency, a first amplitude, and a first offset voltage, forming a second offset voltage substantially equal to the first offset voltage from the first signal, amplifying the amplitude of the first signal to cause the resonant signal to have a second amplitude greater than the first, and forming a second signal having a frequency indicative of the location of a read head relative to a platter of a hard disk drive.

20 Claims, 4 Drawing Sheets

METHODS AND APPARATUS FOR PROXIMITY DETECTION OF HARD DISK DRIVE READ HEADS

FIELD OF THE DISCLOSURE

The present disclosure relates generally to hard drives and, more particularly, to methods and apparatus for proximity detection of hard disk drive read heads.

BACKGROUND

A hard disk drive is a non-volatile storage device that stores digitally encoded data on rotating platters having associated magnetic surfaces that are magnetized to store data theron. A hard disk drive includes a spindle holding at least one platter having a magnetic surface, which spins at a constant speed (e.g., 10,000 revolutions per minute (rpm), 7,200 rpm, or 5,400 rpm). To read information contained on the spinning platter, a read head detects the magnetized portions of the magnetic surface. The read head 108 is coupled with an actuator arm that moves radially across the spinning platters. A hard disk drive read system including a hard disk drive controller is coupled to the read head to receive information therefrom. The hard disk drive controller is configured to control the read operations via a hard disk drive read system.

The read head is positioned close to a platter to read information from the platter via a reproduction signal that is generated by the hard disk drive read system. However, close read head proximity to the spinning platter increases the risk that the read head may come in contact with the magnetic surface of the platter. In the event the read head contacts the spinning platter, the platter and/or the read head may experience performance degradation and/or catastrophic failure.

DETAILED DESCRIPTION

Methods and apparatus for proximity detection of hard disk drive read heads are disclosed herein. Although the example methods and apparatus described herein generally relate to read heads of hard disk drives, the disclosure is not limited to such. On the contrary, the teachings of this disclosure may be applied in any device that would benefit from detection of resonant signals.

Figure 1:
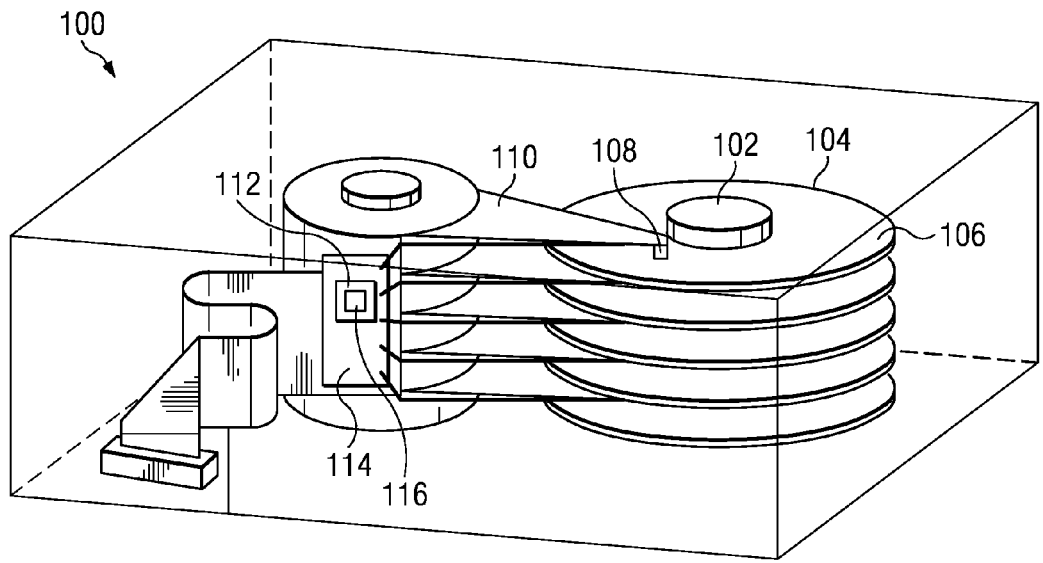
FIG. 1 is an illustration of a hard disk drive including a hard drive read system.

FIG. 1 is an illustration of a hard disk drive 100 having a spindle 102 that holds at least one platter 104 having a magnetic surface 106. At least a portion of the magnetic surface 106 is magnetized with information thereon and a read head 108 detects the magnetized portions of the magnetic surface 106. In particular, a hard disk drive read system 112 of a hard drive controller 114 imparts functionality on the read head 108 to excite the magnetic surface 106 and read information therefrom. As a result, the read head 108 provides an information signal having a carrier frequency that contains digitally encoded information thereon. Generally, the carrier frequency is a high frequency signal approximately between the frequency range of 100 megahertz (MHz) to 1 gigahertz (GHz). The hard drive read system 112 generally amplifies the information signal and prepares the digitally encoded information therein for interfacing the hard disk drive 100 with an electronics device such as a computer, for example.

In the event the read head 108 is close in proximity with the spinning platter 104, a mechanical resonance may exist between the read head 108 and the platter 104. In some examples, when the read head 108 approaches the platter 104, the read head 108 may detect the resonance. As a result, the read head 108 also reads a resonant signal $V_R$ that is included in the information signal as low frequency content provided by the read head 108. In the illustrated example, the frequency of the resonant signal is based on the proximity of the read head 108 relative to the platter 104 and is approximately between the frequency range of 50 kilohertz (kHz) and 500 kHz. Thus, as the read head 108 approaches the platter 104, the amplitude of the resonant signal increases in response. In addition, the amplitude of the resonant signal (i.e., a magnitude of the frequency that is based on time) is generally small in comparison to the information signal and has an unknown amplitude that is generally within the millivolts range (e.g., five to ten millivolts), or may have an amplitude between approximately 1% and 10% of the read signal.

The read head 108 may also detect an unknown common mode voltage $V_{CM}$ (i.e., a DC voltage that is present on both lines from the read head) as a result of the resonance between the read head 108 and the platter, the voltage of which may be substantially larger than the amplitude of the resonant signal. Thus, when the read head 108 is proximate the platter 104, the information signal provided via the read head 108 may include a resonant signal $V_R$ that has an unknown amplitude (e.g., five to ten millivolts) at an unknown frequency and is offset by an unknown first offset voltage, or common mode voltage $V_{CM}$ (i.e., a DC voltage).

The hard drive read system 112 also includes a proximity detector 116 to detect the location of the read head 108 relative to the platter 104. As described above, the frequency and amplitude of the resonant signal is based on the distance between the read head 108 and the platter 104. Thus, the proximity detector 116 is configured to form a signal indicative of the frequency of the resonant signal. In some examples, the signal formed by the proximity detector 116 is a square wave signal, the frequency of which can easily be read by digital circuitry, for example. In response to the square wave signal, the hard drive controller 114 can take corrective action to prevent the read head 108 from contacting the platter 104, thereby preventing catastrophic failure of the hard drive 100.

Figure 2:
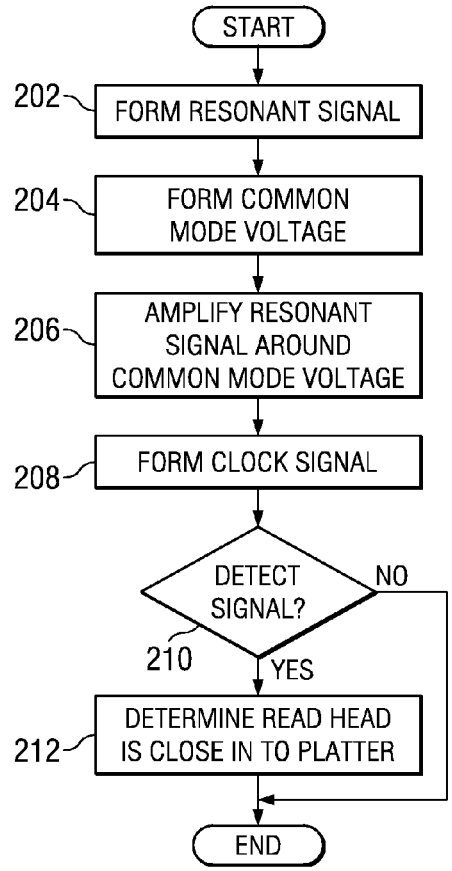
FIG. 2 is a flowchart of a process to detect the proximity of the read head relative to a spinning platter.

FIG. 2 illustrates an example process 200 to detect the frequency of the resonant signal in order to determine when a read head is close in proximity to a platter of a hard disk drive. The example process 200 forms the resonant signal from the information signal produced by the read head when the read head is close in proximity to the platter (block 202). However, in the event the read head is not close in proximity to the platter, the example process 200 is not able to form the resonant signal. In some examples, the example process 200 receives an amplified version of the information signal that is not susceptible to Gaussian noise, for example. The example process 200 removes the carrier frequency containing the digitally encoded information from the information signal, thereby forming the resonant signal offset by the common mode voltage. As described above, the carrier frequency is generally at a higher frequency than the resonant signal and, thus, can be removed by a low pass filter, for example.

After forming the resonant signal (block 202), the example process 200 forms a second offset voltage substantially equal to the common voltage (block 204). In some examples, the example process 200 may remove the resonant signal by filtering, thereby forming a second offset voltage that is substantially equal to the common mode voltage. After forming the common mode voltage, the resonant signal is amplified around the common mode voltage without substantially affecting the common mode voltage (block 206). As a result, the example process 200 increases the amplitude of the resonant signal without substantially affecting the common voltage, thereby preventing saturation of an amplifier because the common mode voltage may be substantially larger than the amplitude of the resonant signal.

After amplifying the resonant signal around the common mode voltage, the resonant signal and the second offset voltage are used to form a signal indicative of the frequency of the resonant signal (e.g., a clock signal) (block 208). In some examples, the signal may be a square wave signal of pulses that has a clock rate that is substantially equal to the frequency of the resonant signal that can be read by digital circuitry. Of course, the square wave signal could be any suitable signal capable of being processed by any circuit such as an analog-to-digital converter, for example. After forming the square wave signal, the example process 200 detects the presence of the square wave signal (block 210). In the event the example process 200 detects the square wave signal, the example process 200 therefore determines that the read head is close in proximity to the platters (block 212). As a result, the hard disk drive is able to take corrective action to prevent the read head from contacting its associated platter.

After determining the read head is too close in proximity to the platter or if the example process 200 is unable to detect the clock signal, the example process 200 ends. Although the foregoing describes a particular sequence of operations, the sequence of operations of the example process 200 may vary. For example, the stages of the process may be rearranged, combined, or divided. Alternatively or additionally, additional stages, processes or operations may be added. In other examples, stages of the process may be removed.

Figure 3:
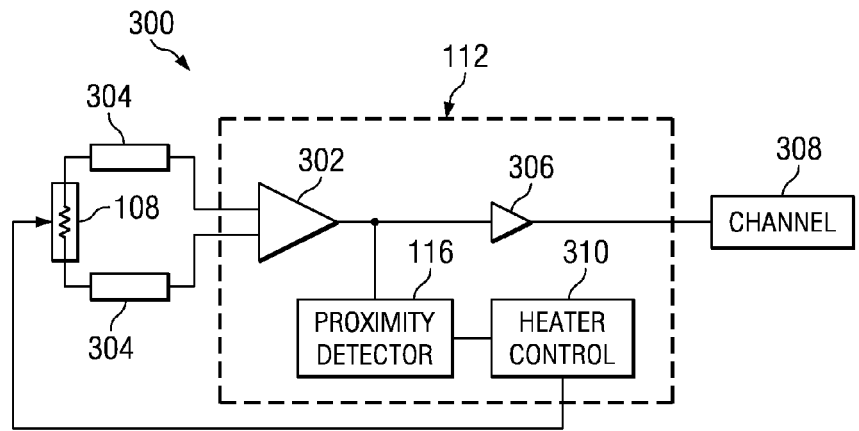
FIG. 3 is a block diagram of an example hard disk drive read system that implements the example process 200.

FIG. 3 illustrates an example hard disk drive read system 112 that implements the example process 200. In the illustrated example, the read head 108 is generally implemented by a magneto-resistive head and is coupled to a preamplifier 302 via transmission lines 304. The hard disk drive read system 300 imparts functionality on the read head 108, causing the read head 108 to convey an information signal containing digitally encoded information to the preamplifier 302. The preamplifier 302, which is a low noise amplifier that prevents degradation of the information signal, amplifies and conveys the information signal to an amplifier 306. The amplifier 306 further amplifies, conditions, and conveys the information signal to one or more channels 308, which detect the information encoded in the information signal.

At the same time, the preamplifier 302 also conveys the information signal to the proximity detector 116 that, for example, implements the example process 200. Using the information signal, the proximity detector 116 forms a signal indicative of the distance between the read head 108 and the platter of the hard disk drive (not shown). The proximity detector 116 conveys its output to an example heater controller 310 of the hard drive controller 114, which is further coupled to the read head 108. In the illustrated example, the heater controller 310 controls the fly height of the read head 108 relative to the platter 104 of the hard disk drive. In response to the signal provided via the example proximity detector 116, the heater controller 310 takes corrective action and prevents the read head 108 from contacting its associated platter 104.

Figure 4:
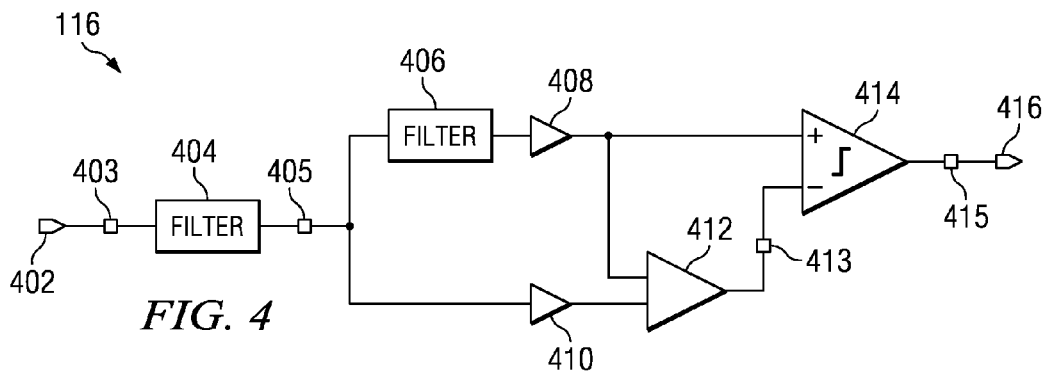
FIG. 4 is a block diagram of an example proximity detector of FIG. 3.

FIG. 4 illustrates a block diagram of the example proximity detector 116 that may implement all or part of the example process 200. In the example of FIG. 4, the proximity detector 116 is configured in the hard disk drive read system 300 to detect the proximity of the read head 108 relative to the platter containing the digitally encoded information thereon. In the example of FIG. 4, an input 402 of the proximity detector 116 receives the information signal provided via the read head 108, which is generally amplified to prevent the introduction of parasitics such as noise, for example. As described above, when the read head 108 is proximately close to the platter, the read head 108 also receives the information signal having the resonant signal contained therein as low frequency content, for example.

Figure 5A:
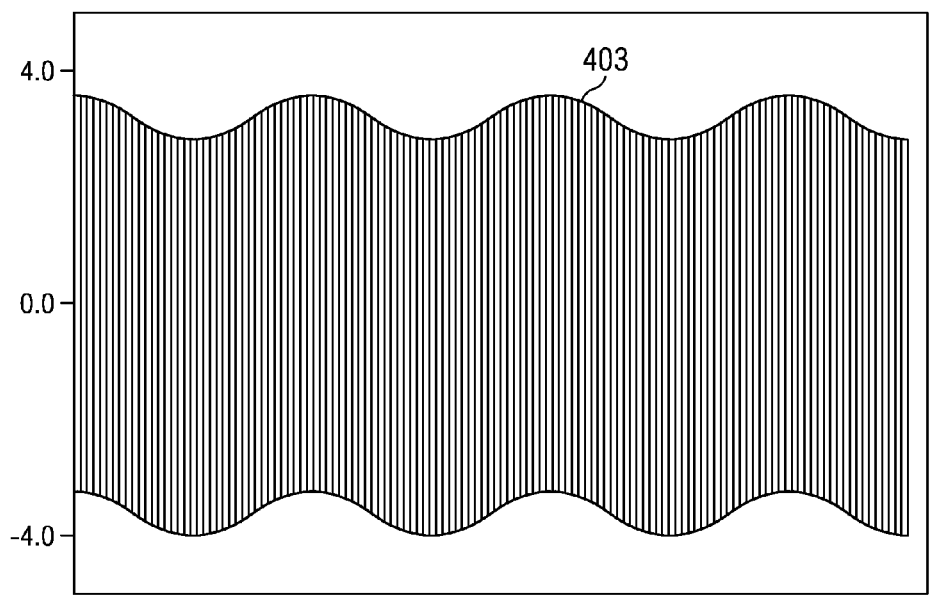
FIGS. 5A-5D illustrate the signals at different locations of the proximity detector of FIG. 4.
Figure 5B:
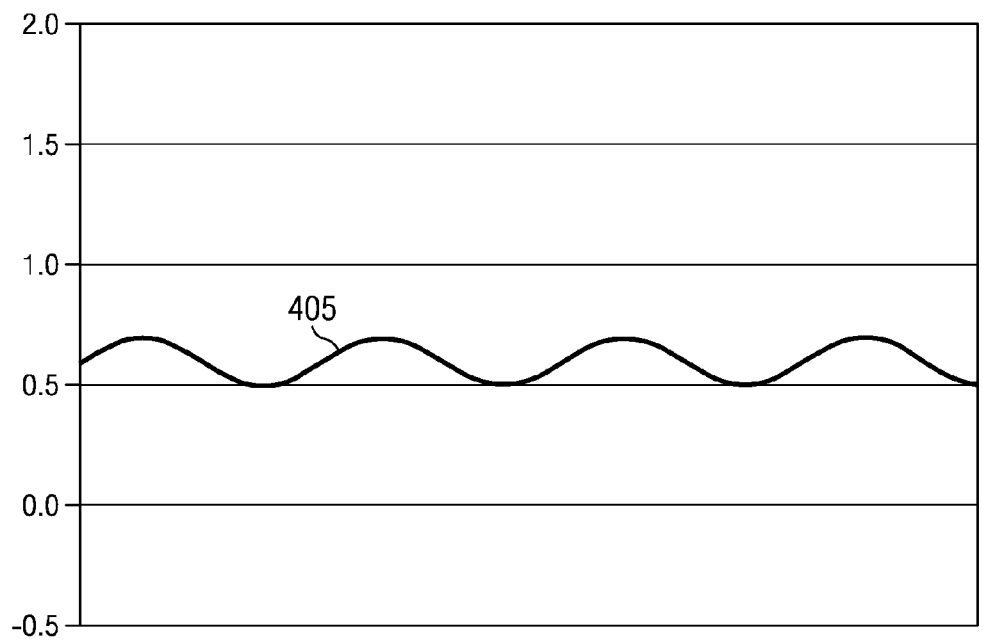

In the illustrated example, a filter 404 receives the information signal from the input 402 and removes the carrier frequency containing the digitally encoded information. FIG. 5A illustrates the information signal at a node 403 having the carrier frequency including the resonant signal contained therein as low frequency content. The filter 404 may be implemented by any suitable device, such as a low pass filter that removes a portion of the information signal above a particular frequency. In the illustrated example, the filter 404 has a cutoff frequency (e.g., 500 kHz, etc.) and substantially removes frequency content in the information signal above the cutoff frequency. Because the resonant signal has a frequency below the cutoff frequency, the filter 404 thereby forms the resonant signal at a node 405 that includes the first offset voltage as illustrated in the example of FIG. 5B. In such an example, the filter may be implemented by a second order, programmable low pass filter having a cutoff of −40 decibels (dB) per decade, for example. Of course, the filter 404 may be implemented by any suitable device, circuit, and/or configuration.

The filter 404 conveys the resonant signal to a second filter 406, which further is configured to remove the resonant signal and form a second offset voltage (i.e., a DC voltage) that is substantially equal to the first offset voltage. As described above, the resonant signal typically has a frequency approximately between the ranges of 50 kHz to 500 kHz. Thus, in the illustrated example, the second filter 406 is implemented by any suitable device and/or circuit that removes the resonance signal without substantially affecting the first offset voltage. For example, a low pass filter with a cutoff frequency approximately equal to 5 kHz may remove the resonant signal without affecting the common mode voltage, thereby forming the second offset voltage that is substantially equal to the first offset voltage.

The second filter 406 conveys the second offset voltage to a first buffer amplifier 408. At the same time, the filter 404 also conveys the resonant signal having the first offset voltage to a second buffer amplifier 410. The buffer amplifiers 408, 410 are configured to prevent voltage division (i.e., loading) of their respective signals by presenting a large impedance to the filters 404, 406. The buffer amplifier 408 conveys the second offset voltage to the differential amplifier 412 and the buffer amplifier 410 conveys the resonant signal to the differential amplifier 412. In addition, the buffer amplifier 408 conveys the second offset voltage to a comparator 414.

Figure 5C:
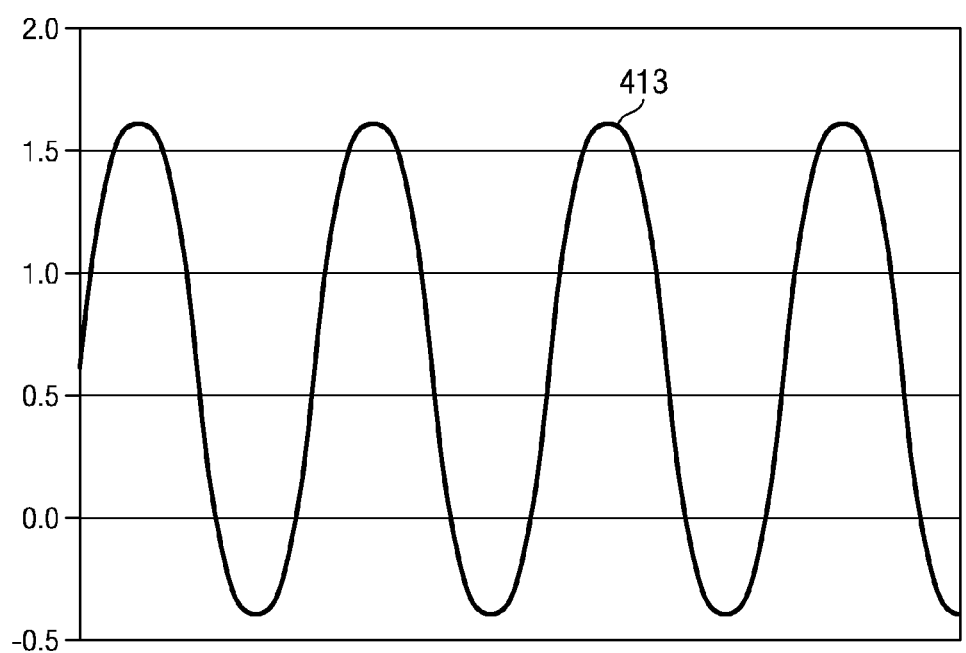

The differential amplifier 412 receives both the second offset voltage and the resonant signal $V_R$ and amplifies the amplitude of the resonant frequency around the first offset voltage of the resonant signal. Because the first offset voltage is generally larger than the amplitude of the resonant signal, the amplification of the first offset voltage may saturate the differential amplifier 412. Thus, the differential amplifier 412 is configured to amplify the amplitude of the resonant signal from a first amplitude to a second amplitude without substantially affecting the first offset voltage. At the same time, the differential amplifier 412 is configured to prevent offset errors due to internal mismatches within the differential amplifier 412. As a result, the output of the differential amplifier 412 will be the resonant signal having a second amplitude that includes the first offset voltage. In such a case, the resonant signal is amplified so that its frequency can be detected. FIG. 5C illustrates the amplified resonant signal at a node 413 at the output of the differential amplifier 412. In the illustrated example, the differential amplifier 412 amplifies the amplitude of the resonant signal by a factor of 10, for example. As illustrated in the examples of FIGS. 5B and 5C, the common mode voltage is not affected by the differential amplifier 412.

Figure 5D:
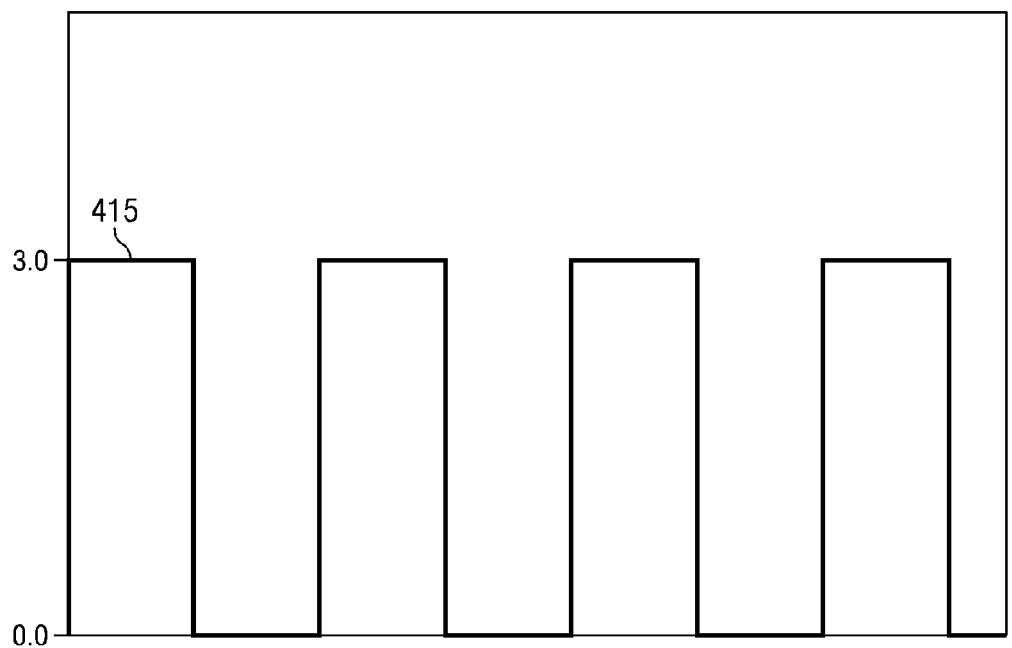

To detect the frequency of the resonant signal, the differential amplifier 412 is coupled to a non-inverting terminal of the comparator 414, which also receives the second offset voltage from the buffer amplifier 408 via its inverting input. The comparator 414 compares the voltage of the amplified resonant signal, which is offset by the first offset voltage, to the second offset voltage that is substantially equal to the first offset voltage. In the event that the resonant signal has a positive amplitude with respect to the first offset voltage, the voltage of the resonant signal from the differential amplifier 412 exceeds the second offset voltage. As a result, the comparator 414 conveys a high voltage to an output 416, which is illustrated at node 415 in the example of FIG. 5D. On the other hand, when the resonant signal has a negative amplitude with respect to the first offset voltage, the voltage of the resonant signal does not exceed the voltage of the second offset voltage. As a result, the comparator 414 conveys a low voltage to the output 416 as illustrated in the example of FIG. 5D.

In other words, when the resonant signal of the resonant signal has a positive amplitude (i.e., the magnitude of the frequency is positive), then the sum of the first offset voltage and the amplitude exceeds the voltage of the second offset voltage and the comparator 414 conveys a high voltage (e.g., three volts). When the resonant signal of the resonant signal has a negative amplitude (i.e., the magnitude of the frequency is negative), the sum of the first offset voltage and the amplitude does not exceed the second offset voltage and, thus, the comparator 414 conveys a low voltage (e.g., zero volts). Thus, the example proximity detector 116 produces a signal indicative of the frequency of the resonant signal.

In particular, the signal produced by the comparator 414 is a pulse wave that is capable of being easily read by a circuit to determine the frequency of the resonant signal. The example pulse wave has a duty cycle substantially equal to 50% and its clock rate is substantially equal to the frequency of the resonant signal. In other words, the time period of one cycle of the pulse wave produced by the comparator 414 is substantially equal to the time period of one cycle of the resonant signal. Of course, the duty cycle of the pulse wave will change as the frequency of resonant signal changes. The output 416 is coupled to a processor such as the control circuit 312, for example, which reads the pulse wave provided by the proximity detector 116 and, in response, determines if the read head 108 is close in proximity to the platter 104.

In some examples, the resonant signal is single-ended with respect to a reference signal (e.g., ground) and, as a result, a single-ended amplifier would amplify both its first offset voltage and the amplitude of the resonant signal. As a result, the first offset voltage may saturate the differential amplifier 412 without increasing the amplitude of the resonant signal. However, in the example of FIG. 4, the differential amplifier 412 is configured to amplify the amplitude of the resonant signal around the first offset voltage without amplifying the first offset voltage.

Figure 6:
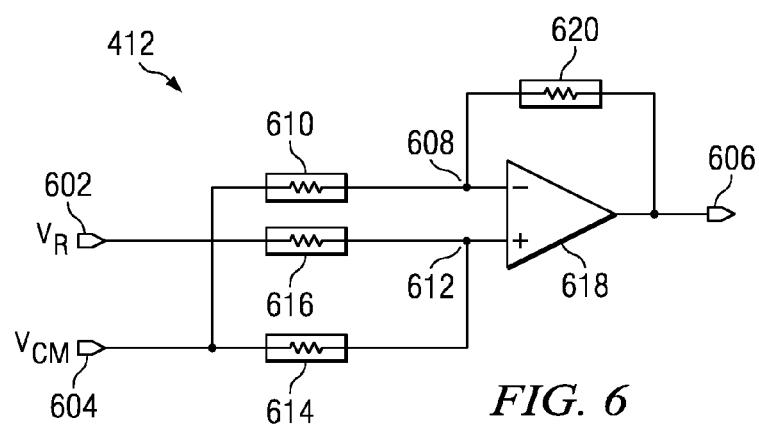
FIG. 6 is a schematic diagram of an example differential amplifier of the example proximity detector of FIG. 4.

FIG. 6 illustrates an example differential amplifier 412, which is configured as a differential to single-ended amplifier. In the illustrated example, the differential amplifier 412 receives the resonant signal $V_R$ via an input 602 and the second offset voltage substantially equal to the first offset voltage $V_{CM}$ via an input 604. A first node 608 of the differential amplifier 412 receives the second offset voltage via a resistor 610 and a second node 612 receives the second offset voltage via a resistor 614. In addition, the second node 612 receives the resonant signal via a resistor 616. In the illustrated example, the first and second nodes 608, 612 are also coupled to the inverting and non-inverting terminals of a differential amplifier 618, respectively. The output of the differential amplifier 618 is coupled to the first node 608 via a resistor 620. In addition, the output of the differential amplifier 618 is coupled to an output 622 of the differential amplifier 612.

Preferably, the differential amplifier 618 is configured to be an ideal differential amplifier and the first and second nodes 608, 612 can be approximately described as having substantially equal voltages. In such an example, the non-inverting and the inverting terminals of the differential amplifier 618 are approximately described as having infinite input impedance, thereby preventing any current from flowing into the non-inverting and inverting terminals of the differential amplifier 618. In the example of FIG. 6, the resistance of the resistors $R_{614}$ and $R_{620}$ are configured to be substantially equal and the resistance of the resistors $R_{610}$ and $R_{616}$ are also configured to be substantially equal.

In the illustrated example, the differential amplifier 412 is configured to amplify the difference between its non-inverting and its inverting terminal. The resulting output of the differential amplifier 412 is single ended (i.e., the signal is defined from the output with respect to a reference signal such as ground, for example). The gain of the differential amplifier 412 is described by Equation 1, below:

$$V_O = K(V_R - V_{CM}) \qquad \text{[Equation 1]}$$

where $V_O$ is the output voltage and K is the gain of the differential amplifier 412, $V_R$ is the resonant signal, and $V_{CM}$ is the second offset voltage. Equation 1 can be rewritten as Equation 2, below:

$$V_O = K(V_R - 0) + K(0 - V_{CM}) \qquad \text{[Equation 2]}$$

As a result of Equation 2, the output of the differential amplifier 412 can be determined via the principles of superposition.

Using the foregoing, the output voltage of the differential amplifier 412 is described by Equation 3, below:

$$V_O = \frac{R_{620}}{R_{610}}(V_R - V_{CM}) + V_{CM} \qquad \text{[Equation 3]}$$

where $R_{520}$ and $R_{510}$ are the resistances of resistors 610 and 620, respectively. Thus, the gain of the differential amplifier 412 is based on the ratio of the resistors 610, 620 and the difference between the resonant signal and the second offset voltage. However, as described above, the resonant frequency includes the first offset voltage, which is substantially equal to the second offset voltage. As a result, the output of the differential amplifier 412 is based on the gain of the resonant signal summed with the first offset voltage. In other words, the differential amplifier 412 increases the amplitude of the resonant signal without substantially affecting the first offset voltage.

Of course, the equations illustrated are ideal and the equations may deviate because the differential amplifier 618 cannot have an infinite slew rate, for example. However, in the illustrated examples, the frequency of the resonant signal is relatively low. As a result, the differential amplifier 618 can be approximated as a substantially ideal differential amplifier having, for example, an infinite slew rate at the frequencies of the resonant signal.

Figure 7:
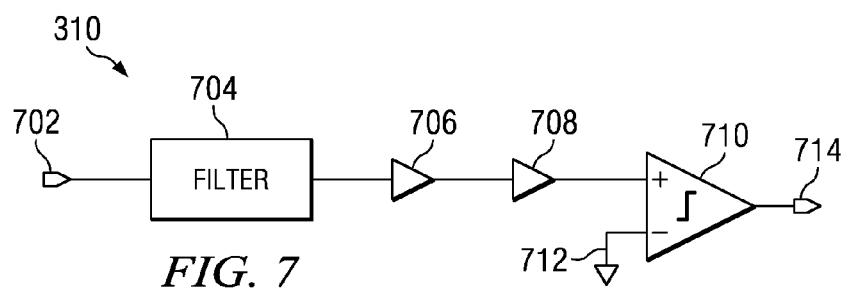
FIG. 7 is a block diagram of another example proximity detector of FIG. 3.

FIG. 7 illustrates another block diagram example proximity detector 116. In the illustrated example, the proximity detector 116 receives the information signal via its input 702. A filter 704 receives the information signal from the input 702 and selectively removes the carrier frequency having the digital encoded information from the signal. At the same time, the filter 704 removes the common mode voltage associated with the resonant signal. As a result, the resonant signal is formed via the filter 704. In the illustrated example, the resonant signal generally has an unknown amplitude at an unknown frequency. The filter 704 conveys the resonant signal to a buffer 706 that prevents degradation of the resonant signal due to loading. The buffer 706 conveys the resonant signal to an amplifier 708, which amplifies the amplitude of the resonant signal. In such an example, the amplifier 708 is configured to amplify the resonant signal without substantially affecting the resonant signal due to offset errors, for example.

The amplified resonant signal is then conveyed to a non-inverting terminal of a comparator 710, which is also coupled to a reference signal 712 (e.g., ground, etc.) via its inverting terminal. The comparator 710 conveys a high voltage when the amplitude of the resonant signal exceeds the voltage of the reference signal 712 and conveys a low voltage when the reference signal 712 exceeds the voltage of the resonant signal. Thus, the comparator 714 conveys a pulse wave that is indicative of the frequency of the resonant signal to an output 716.

In the example of FIG. 7, the filter 704 may be implemented by any suitable device and/or circuit. In some examples, the filter 704 may be implemented by an active or passive (e.g., a saw filter) bandpass filter. In such examples, the filter 704 removes frequency content from the information signal below a particular frequency (e.g., 5 kHz) and, at the same time, removes frequency content from the information signal above a particular frequency (e.g., 10 MHz).

In the illustrated examples, the proximity detectors are implemented to detect a resonant frequency from an information signal of a hard disk drive. The illustrated examples may be readily implemented into existing hard drives to detect when the read head is close in proximity to its associated platter. In particular, the described examples are frequency based rather than threshold based and allow the proximity of the read head to be easily detected without comparing the signals to threshold values, thereby eliminating the use of additional threshold circuits such as programmable voltage settings, and so forth. As a result, the described examples are simple to use in hard disk drives. Further, the proximity detectors are able to detect a resonant signal has an unknown amplitude generally in the millivolts range (e.g., five to ten millivolts), an unknown frequency and an unknown first common mode voltage. In the illustrated examples, the proximity detector extracts the first offset voltage and compares it to an amplified resonant signal that has a substantially equal common mode voltage. In addition, amplifiers for amplifying single-ended signals without amplifying the common mode voltages are also disclosed. In such amplifiers, the amplitude of the signals can be substantially amplified without saturating the amplifier. As a result, offset errors related to the amplifiers can generally be disregarded due to the high gain of the amplifiers. In addition, because the signal produced by the proximity detector is generally a pulse wave, a digital processor may directly interface without the need for an analog-to-digital converter, for example, and thereby remove circuits and other devices from the hard disk drive.

Although certain methods, systems, and articles of manufacture have been described herein, the scope of coverage of this patent is not limited thereto. To the contrary, this patent covers all methods, systems, and articles of manufacture fairly falling within the scope of the appended claims either literally or under the doctrine of equivalents.

What is claimed is:

1. A hard-disk drive system, comprising:
 a hard-disk drive platter storing information;
 a hard-disk drive read system to actuate a read head, the read head forming a first signal having information from the hard-disk drive platter; a
 a proximity detector to receive the first signal and form a second signal indicative of a distance from the read head to the hard-disk drive platter, a frequency of the second signal being based on the distance from the read head to the hard-disk drive platter; and
 a hard-disk drive controller to adjust the distance of the read head from the hard-disk drive platter in response to the second signal,
 wherein the proximity detector comprises:
  a first filter operative for filtering an information signal and transmitting a first signal having a first amplitude and a first offset voltage;
  a second filter coupled to receive the first signal, the second filter operative for filtering the first signal and transmitting a second offset voltage substantially equal to the first offset voltage;
  an amplifier coupled to receive the first signal and the second offset voltage, the amplifier operative for amplifying the first amplitude around the second offset voltage so as to form an amplified signal having a second amplitude, wherein the second amplitude is greater than the first amplitude; and
  a comparator coupled to receive the second offset voltage and the amplified signal, the comparator operative for comparing the second offset voltage and the amplified signal, wherein the comparator detects the location of the read head.

2. A hard-disk drive system as defined in claim 1, wherein the first signal includes a third signal contained in the first signal when the read head is in proximity with the hard-disk drive platter.

3. A hard-disk drive system as defined in claim 2, wherein the third signal is formed by a mechanical resonance between the hard-disk drive platter and the read head.

4. A hard-disk drive system as defined in claim 3, the third signal having a frequency based on the distance from the read head to the hard-disk drive platter.

5. A hard-disk drive system as defined in claim 3, wherein the proximity detector is to form the second signal based on the third signal, the third signal having a common mode voltage.

6. A hard-disk drive system as defined in claim 5, wherein the proximity detector is to amplify the third signal around the common mode voltage and compare the amplified third signal to the common mode voltage to form the second signal.

7. A hard-disk drive system as defined in claim 1, wherein the second signal is a square wave.

8. A method of detecting a location of a read head, the method comprising:
   receiving an information signal from the read head;
   filtering the information signal so as to form a first signal having a first amplitude and a first offset voltage;
   filtering the first signal so as to form a second offset voltage substantially equal to the first offset voltage;
   amplifying the first amplitude around the second offset voltage so as to form an amplified signal having a second amplitude, wherein the second amplitude is greater than the first amplitude; and
   comparing the second offset voltage and the amplified signal, wherein comparing detects the location of the read head.

9. The method of claim 8, wherein comparing detects the location of the read head relative to a platter in a hard disk drive.

10. The method of claim 8, further comprising either buffering the second offset voltage before forming the amplified signal or buffering the first signal before forming the amplified signal.

11. The method of claim 8, wherein detecting the proximity of the read head comprises forming a second signal having a second frequency substantially equal to a first frequency associated with the first signal.

12. The method of claim 8, wherein filtering the information signal comprises removing a cattier signal.

13. The method of claim 8, wherein comparing comprises producing pulses depending on either whether the second offset voltage is greater than the amplified signal or whether the amplified signal is greater than the second offset voltage.

14. An apparatus for detecting a location of a read head in a hard disk drive, the apparatus comprising:
   a first filter operative for filtering an information signal and transmitting a first signal having a first amplitude and a first offset voltage;
   a second filter coupled to receive the first signal, the second filter operative for filtering the first signal and transmitting a second offset voltage substantially equal to the first offset voltage;
   an amplifier coupled to receive the first signal and the second offset voltage, the amplifier operative for amplifying the first amplitude around the second offset voltage so as to form an amplified signal having a second amplitude, wherein the second amplitude is greater than the first amplitude; and
   a comparator coupled to receive the second offset voltage and the amplified signal, the comparator operative for comparing the second offset voltage and the amplified signal, wherein the comparator detects the location of the read head.

15. The apparatus of claim 14, wherein the first signal has a frequency between approximately 50 kHz and approximately 500 kHz.

16. The apparatus of claim 14, wherein the first offset voltage is a DC offset and the second voltage is a reference voltage.

17. The apparatus of claim 14, further comprising a first buffer coupled to the second filter, the amplifier, and the comparator.

18. The apparatus of claim 14, further comprising a second buffer to the second filter and coupled between the first filter and the amplifier.

19. The apparatus of claim 14, wherein the first filter removes a carrier signal having information read from a platter within the hard disk drive.

20. The apparatus of claim 14, wherein the first signal is a resonant signal that exists when the read head is proximate a platter associated with the disk drive.

* * * * *